(12) United States Patent
Beguet

(10) Patent No.: US 7,817,804 B2
(45) Date of Patent: Oct. 19, 2010

(54) ACOUSTIC MEASURING SYSTEM FOR LOCATING NOISE SOURCES

(75) Inventor: Bernard Beguet, Saint Bel (FR)

(73) Assignee: Airbus France, Toulouse (FR)

( * ) Notice: Subject to any disclaimer, the term of this patent is extended or adjusted under 35 U.S.C. 154(b) by 1553 days.

(21) Appl. No.: 11/027,939

(22) Filed: Jan. 4, 2005

(65) Prior Publication Data

US 2005/0163330 A1 Jul. 28, 2005

(30) Foreign Application Priority Data

Jan. 9, 2004 (FR) .................................. 04 00202

(51) Int. Cl.
*H04R 3/00* (2006.01)
(52) U.S. Cl. ............................ 381/92; 381/56; 381/122; 367/118; 367/119
(58) Field of Classification Search ............. 381/92, 381/94.1–94.9, 56, 58, 71.1–71.14; 367/7–8, 367/118–126; 702/54, 56, 138
See application file for complete search history.

(56) References Cited

U.S. PATENT DOCUMENTS

| 6,862,541 | B2 * | 3/2005 | Mizushima | 702/76 |
| 7,116,791 | B2 * | 10/2006 | Matsuo | 381/92 |
| 7,162,043 | B2 * | 1/2007 | Sugiyama et al. | 381/92 |
| 7,248,703 | B1 * | 7/2007 | Heine et al. | 381/71.1 |

* cited by examiner

*Primary Examiner*—Vivian Chin
*Assistant Examiner*—Fatimat O Olaniran
(74) *Attorney, Agent, or Firm*—Oliff & Berridge, PLC

(57) ABSTRACT

This system has a plurality of microphones oriented in several directions and mounted in a support so that each one is flush with or disposed on a rigid surface, the various microphones being connected to a signal processing device that processes the signals coming from the microphones to provide a noise source hologram, namely a distribution of the acoustic pressures or intensities at various points on a given surface.

5 Claims, 2 Drawing Sheets

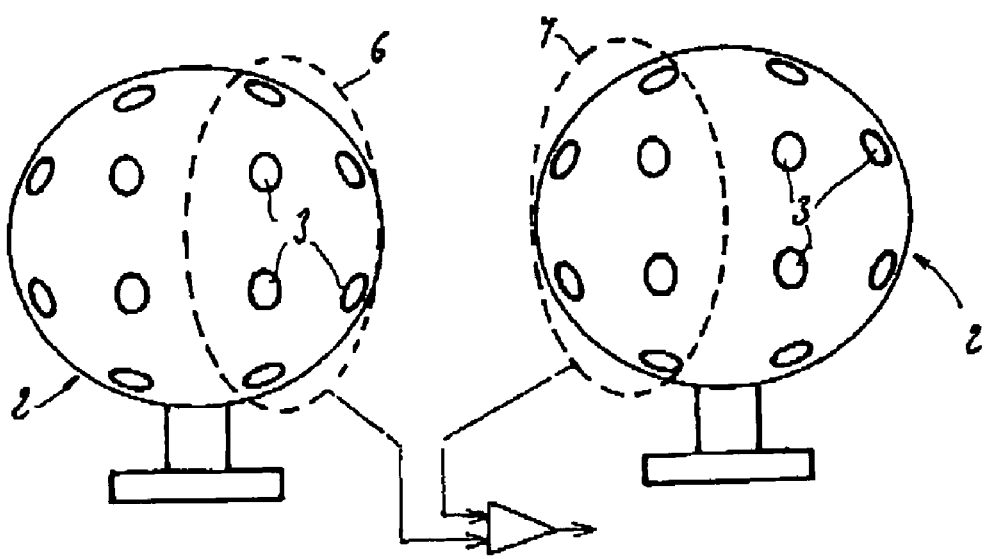

ACOUSTIC MEASURING SYSTEM FOR LOCATING NOISE SOURCES

BACKGROUND

The present invention relates to an acoustic measuring system for locating noise sources and measuring their intensity.

SUMMARY

Acoustic comfort inside an enclosure, particularly the passenger compartment or cockpit of a vehicle such as an automobile or aircraft, has become a significant factor in competition. To optimize it, it is necessary to know the degree of sound radiation of the various panels in the compartment such as the window or covered wall, so that acoustic insulation operations can be applied where necessary. For this purpose, means for determining noise sources as well as the sound intensity of such sources must be provided.

A known device consists of several omnidirectional microphones, 24 of them for example, disposed in one plane. The plane on which the microphones are located is directed substantially perpendicularly to the presumed direction of the noise source. The microphones measure the acoustic pressure resulting from noise emission and each microphone sends a signal to a processing device. This processing device yields a noise source hologram.

The noise source hologram is obtained by making calculations at various points, as the microphones measure the acoustic pressure for each point, taking into consideration the phase differences of the various microphones with respect to the various measuring points.

While these devices are appropriate for measuring outside noise, for example for measuring the noise of an engine on the bench, they are inadequate when placed inside a cockpit or passenger compartment because they are unable to distinguish between the waves arising in front or behind the antenna of which the microphone set consists.

The noise source hologram is obtained by making calculations at various points, with the microphones measuring the acoustic pressure for each of the points, taking into account the phase differences of the distances of the various microphones from the various measuring points.

When the microphones used are placed in one plane, and the noise emission from one wall is to be measured, the microphones must be placed very close to this wall so that the noise from the other walls or the remainder of the enclosure such as a passenger compartment is negligible by comparison with the wall noise.

In addition, since the plane antenna of which the microphones are composed has a small surface area and must be placed at a short distance from the wall, the antenna must be moved in front of the wall, namely sequential measurements on overlapping surfaces must be made, with the problem of resynchronizing the various inputs, providing at least one common measuring weight between one input at one surface and another input at an adjacent surface, so that resynchronization can be effected.

Document JP 4,072,525 describes a spherical antenna with six microphones intended for processing based on the times at which the signals reach the various microphones. At its output, this system provides only the direction from which a source arrives. This processing is effective only if there is a single source located in a remote field. It cannot function in a passenger compartment where there are several sources. Even if there is only one noise source in a compartment, reflections from the other walls would lead to different waves impinging on the sphere. Moreover, processing requires the microphones to be located 90° apart.

The document US 2003/147539 describes a spherical antenna used for breakdown and processing of waves on a spherical base. Back-propagation of the waves and their summing at a given point allows the sounds emitted by this point to be played back. This device is useful for auditoriums, for example. Processing is done by an electronic system. This system enables the noise from different parts of an enclosure, for example from a stage scene, to be listened to simultaneously.

The technical problem on which the invention is based is to provide a system that enables noise from inside an enclosure to be located precisely and simply.

For this purpose, the system to which it relates has a plurality of microphones oriented in several directions and mounted in a support so that each one is flush with or disposed on a rigid surface, the various microphones being connected to a signal processing device that processes the signals coming from the microphones to provide a noise source hologram, namely a distribution of the acoustic pressures or intensities at various points on a given surface.

Each microphone "sees" in particular the noise sources opposite it, with the rigid body playing the role of a screen for the noise sources located behind the rigid body, relative to the microphone in question.

For each calculation point, the phase difference between the various microphones, due not only to the distance between the various microphones and the calculation point but also to the presence of the rigid body must be taken into account, as the sound waves do not pass through the rigid surface but pass around it. As a result the travel time of the sound wave increases for microphones located behind the rigid body, relative to the noise source, which increases the phase difference between the various microphones and hence increases the resolution of noise source pinpointing.

Advantageously, the microphone support is covered with an absorbent material such as cellular foam.

According to one embodiment of this system, the microphone support is a sphere.

The various microphones are distributed over the surface of the sphere. The sphere has the advantage of being a natural shape whose behavior is easy to model. For a given source position, the modulus and phase of the acoustic pressure measured by each microphone can be calculated for each frequency.

According to another embodiment of this system, the microphone support is comprised of two parallel disks connected to each other by a portion of toroidal surface, the microphones being located in disks.

This second embodiment has the advantage of properly separating the two half-spaces.

It is also possible to envisage various shapes for the rigid support, which may be ellipsoidal or parallelepipedic.

Advantageously, the system according to the invention consists of distributing into two groups a number of microphones belonging to one or two supports, before a measurement is performed.

This arrangement enables greater resolution to be obtained for certain frequencies, particularly for low frequencies.

This distribution into two groups of a certain number of microphones belonging to one or two supports enables differential processing of the signals from the various microphones in the two groups and to be performed for the two groups.

This differential processing may represent the functioning of the human ear.

According to a first embodiment, this system consists of carrying out a focusing operation for each group of microphones at each point where it is desirable to know whether a noise source exists, then, for each calculation point, taking the difference between the focused signals of the two groups, this difference being zero when the calculation point corresponds to the location of the noise source.

According to a second embodiment, this system consists of conducting a focusing operation for a group of microphones at various points, located near this group, to determine the existence of noise sources at these various points and, for the other microphone group, to conduct a focusing operation at points opposite to the first points, then, for each group of two points, taking the difference between the focused signals of the two groups, this difference being at a maximum when the calculation point corresponds to the location of the noise source.

A method for implementing this system consists of positioning the microphone support in an enclosure, where the three-dimensional coordinates of each microphone are known, in order to measure noise "sources" on a surface, and performing focusing operations sequentially at various points of this surface, the coordinates of which are known, and, for each point and at each frequency, calculating the sound level from the pressure according to the formula:

$$P(x, y, z) = \sum A_i P_i \left( t - \frac{r_i}{c} \right) x Hrtf$$

where:
P=calculation results at a point x, y, z of the hologram,
Pi=Pressure measured by a microphone i,
$r_i$=distance between the microphone i and the calculation point,
$A_1$=coefficient,
Hrtf=transfer function of the rigid body, for a given microphone and a given focusing point (x, y, z), taking into account the nature, shape, and size of the support,
and establishing a hologram from the calculations made for the various focusing points.

BRIEF DESCRIPTION OF THE DRAWINGS

The invention will be fully understood from the following description which refers to the attached schematic drawings with several embodiments of this system shown as non-limiting examples.

FIG. 6 shows a variant of the system in FIGS. 4 and 5 in which the two microphone groups belong to two different supports.

DETAILED DESCRIPTION OF EMBODIMENTS

Figure 1:
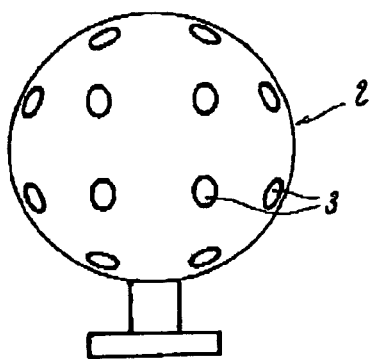
FIG. 1 is an elevation view of a first system.

FIG. 1 shows a sphere 2 made of a rigid material, the outer surface of which may be covered with a coating material such as foam, or may be perforated. Inside sphere 2 are mounted 24 microphones 3, each of which is flush with the surface of sphere 2.

Figure 2:
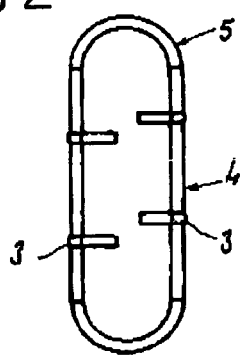
FIG. 2 is a cross-sectional view of a second system.
Figure 3:
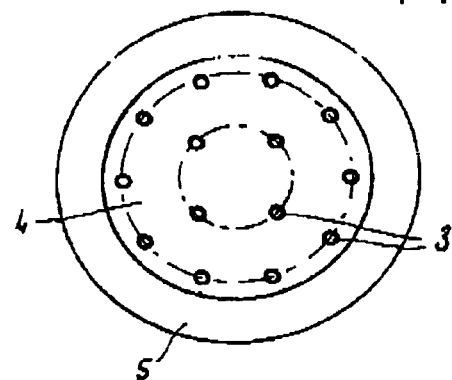
FIG. 3 is an elevation view of the system of FIG. 2.

FIGS. 2 and 3 show an alternative embodiment of this system in which the rigid body has a different shape, and is comprised of two plane disks 4 connected with each other by a section of a torus 5. As shown in FIG. 3, the microphones 3 are flush with the surfaces of the two disks. This embodiment has the advantage of properly separating the two half-spaces.

Figure 4:
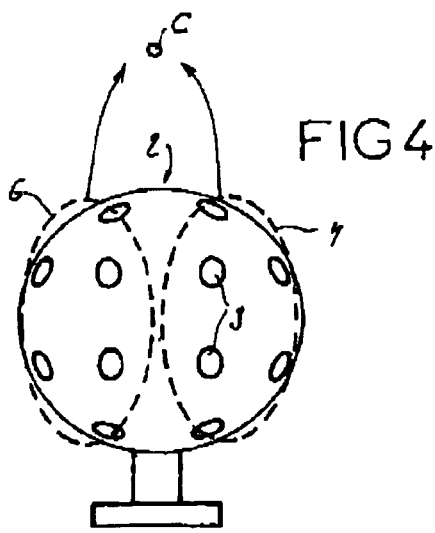
FIGS. 4 and 5 are two views showing schematically the processing of signals received by the two microphone groups.
Figure 5:
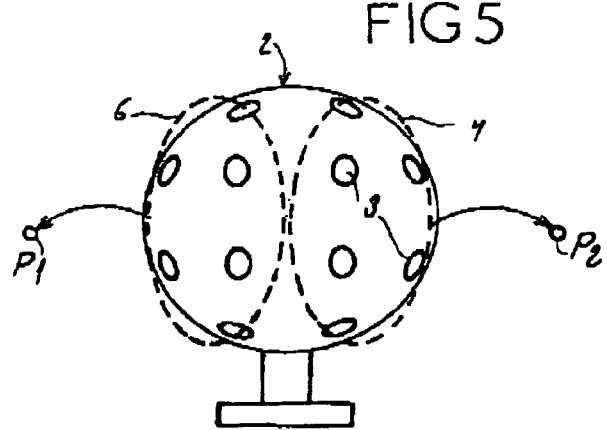

FIGS. 4 and 5 show the device in FIG. 1, namely a sphere 2 equipped with a number of microphones, specifically 24. Some microphones are grouped into a group 6, while others form a group 7. It should be noted that groups 6 and 7 do not necessarily contain all the microphones in sphere 2. It should also be noted that this group is a virtual rather than a physical group, as it is created at the point where the signals received by the various microphones in the two groups 6 and 7 are processed.

FIGS. 4 and 5 show the implementation of so-called differential processing. For this purpose, processing enables the position of the source with maximum noise to be estimated. For each point being assessed for noise, a differential estimator must be calculated, as follows. First, a focussing operation is effected for a single calculation point C for the two microphone groups 6 and 7. The difference function of the two results from the microphone groups is calculated. This calculation is repeated for all the points being assessed to see whether there is a source. In the embodiment shown in FIG. 4, focussing is done on the same point C for both groups 6 and 7, and the difference function is minimal when the calculation point C is located at the position of the noise source.

FIG. 5 shows an alternative embodiment wherein the same elements are given the same numerical references as before. In this case, a focussing operation is done for microphone group 6 at a point P1 which is the point being tested to see whether it corresponds to the noise source, while focussing for the microphones in group 7 is done at a point P2 located on the side opposite point P1. The difference function between the two focussing results is calculated. In this second solution, the difference function is at a maximum when the calculation point P1 is located at the position of the actual noise source.

FIG. 6 is an alternative embodiment wherein the groups 6 and 7 of microphones 3 belong to two different spheres 2.

As can be seen from the foregoing, the invention provides a major improvement to the prior art by providing a simply-designed device that pinpoints a noise source and measures its intensity, even inside a passenger compartment or cockpit, by distinguishing between the waves arriving in front of or behind the antenna formed by different microphones, and supplying a signal processing mode that further improves the conditions under which a noise source is located.

It goes without saying that the invention is not confined to the embodiments of this system described above as examples, but on the contrary includes all their variants. Thus, in particular, the rigid microphone support could be a different shape, parallelepipedic for example, or the signal processing may not be differential processing but merely creation of a hologram known of itself, without thereby departing from the framework of the invention.

The invention claimed is:
1. A method for implementing a system for locating noise sources and measuring their intensity, the system comprising a plurality of microphones oriented in several directions and mounted in a support so that each one is flush with or disposed on a rigid surface, the microphones being connected to a signal processing device that processes the signals coming from the microphones to provide a noise source hologram, the noise source hologram being a distribution of the acoustic pressures or intensities at various points on a given surface, the method comprising:
   positioning the support of the microphones in an enclosure, where three-dimensional coordinates of each microphone are known, to measure noise sources on a surface;

performing focusing operations sequentially at various focusing points of the surface, coordinates of which are known;

for each point and at each frequency, calculating a sound level from a pressure according to the formula:

$$P(x, y, z) = \sum A_i P_i\left(t - \frac{r_i}{c}\right) \times Hrtf$$

where:
P=calculation results at a point x, y, z of the hologram,
$P_i$=pressure measured by a microphone i,
$r_i$=distance between the microphone i and the calculation point,
$A_i$=coefficient, and
Hrtf=transfer function of a rigid body, for a given microphone and a given focusing point (x, y, z), taking into account a nature, a shape, and a size of the support; and establishing a hologram from the calculations results for the various focusing points.

2. The method according to claim 1, further comprising:
distributing a number of microphones belonging to one or two supports into two groups before a measurement is made.

3. The method according to claim 2, further comprising:
differential processing of the signals coming from the microphones in the two groups, for the two groups.

4. The method according to claim 3, further comprising:
conducting a focusing operation for each group of microphones at each calculation point where it is desirable to know whether a noise source exists; and then, for each calculation point, calculating a difference between focused signals of the two groups, the difference being zero when the calculation point corresponds to the location of the noise source.

5. The method according to claim 3, further comprising:
conducting a focusing operation for a first group of microphones at first points located near the first group, to determine an existence of noise sources at the first points;

conducting a focusing operation for a second group of microphones at second points opposite to the first points; and then, for each group of two points, calculating a difference between focused signals of the two groups, the difference being at a maximum when a calculation point corresponds to the location of a noise source.

* * * * *